April 23, 1963 W. F. GERMACK 3,086,703
WEIGHT AND BALANCE COMPUTER
Filed April 26, 1960 3 Sheets-Sheet 1

INVENTOR.
W. F. GERMACK
BY Robb & Robb
Attorneys

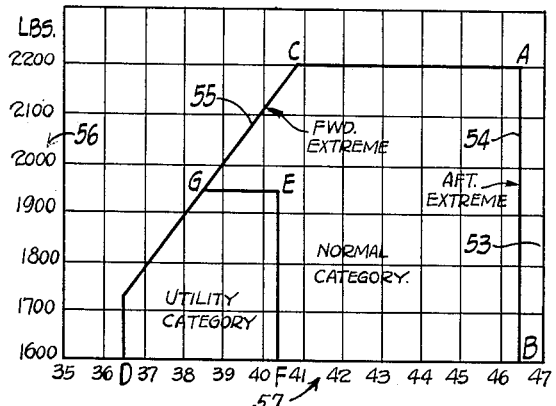

|   |   |   |   |   |   |
|---|---|---|---|---|---|
| A | = | 2200 × 46.4 | = | 102,000 |
| B | = | 1600 × 46.4 | = | 73,000 |
| C | = | 2200 × 40.8 | = | 90,000 |
| D | = | 1600 × 36.4 | = | 58,200 |
| E | = | 1950 × 40.3 | = | 78,500 |
| F | = | 1600 × 40.3 | = | 63,500 |
| G | = | 1950 × 38.4 | = | 74,800 |

Fig. 6

TO LAY OUT WEIGHT SECTION ON RIGHT
SIDE OF "O" LINE 360° IS EQUAL TO 1200 LBS.

FRONT SEAT  450 LBS. = .375 OF 360° OR 135°
REAR SEAT   450 LBS. = .375 OF 360° OR 135°
MAX. USABLE FUEL OF 37 GALS. = 222 LBS. = .185 OF 360° OR 66.6°
BAGGAGE  120 LBS. = .10 OF 360° = 36°
AUX. FUEL  17½ GALS. 105 LBS. IS 360° = 46.8°

Fig. 7

TO LAYOUT MOMENT SECTION ON LEFT SIDE
OF "O" LINE 360° IS EQUAL TO 80,000 IN LBS.

450 LBS. AT 36 IN. = 16,400 IN. LB. MOMENT = .205 OF 360° = 74°
450 LBS. AT 70 IN. = 31,500 IN. LB. MOMENT = .394 OF 360° = 142°
222 LBS. AT 48 IN. = 10,650 IN. LB. MOMENT = .133 OF 360° = 48°
120 LBS. AT 95 IN. = 11,400 IN. LB. MOMENT = .1425 OF 360° = 51°
105 LBS. AT 99 IN. = 10,400 IN. LB. MOMENT = .13 OF 360° = 47°

Fig. 8

INVENTOR.
W. F. GERMACK
BY
Robert Robb
attorneys

3,086,703
Patented Apr. 23, 1963

3,086,703
WEIGHT AND BALANCE COMPUTER
Walter F. Germack, R.D. 4, Clay St., Geneva, Ohio
Filed Apr. 26, 1960, Ser. No. 24,837
3 Claims. (Cl. 235—61)

This invention relates to the class of aircraft usually designated as personal or private aircraft, as distinguished from commercial or similar types of aircraft.

The particular problem to which this invention is directed, is that of determining the proper loading and distribution of such load, or in the language of particular use, the problem is specifically known as that of weight and balance.

While the question of weight and balance in private or personal aircraft, has been considered and is considered by the manufacturer, many times the necessity to effect certain calculations in regard to weight and balance, is neglected by the small plane operator and as a result injuries and loss of life are often the consequence.

One of the primary problems involved is that of the necessity to calculate the weight and balance factors in aircraft of the type to which this invention is directed, which is neglected because it does require some mathematical analysis and actual computation.

It is thus apparent that if some means of simplifying the computations necessary to provide for operation of a small aircraft in complete safety, is available, such means would be highly desirable and certainly much more likely to be used than would the bare figures supplied by an aircraft manufacturer.

It should be pointed out of course that all of the necessary data is supplied by an aircraft manufacturer, which will enable the operator to properly distribute the weight and thus effect balance for operation in safe condition, but the problem of putting these figures together and obviating assembling of a considerable amount of scattered data relatively speaking, is probably the reason that such data is not actually used except by the extremely careful pilot or operator.

To the foregoing end, therefore, the instant invention has been conceived, as embodying, in a simple device, all of the necessary data to enable the computation of the weight and balance of aircraft of the personal or private type in view of the many possible combinations of weight which are often encountered by the operator of such aircraft.

The basic concept here is that of providing a computing device which will include the necessary data in such a manner as it may be assembled in the different combinations and permutations so as to instantly advise the operator whether the aircraft safety will be endangered by operation in the manner contemplated or whether the operation of the aircraft will be within the safe range as found by the manufacturer in relation to the various combinations which may possibly be effected.

It is therefore a principal object of this invention to provide a computer of the class herein suggested, as the same may be suitable for use with private or personal aircraft, which computer is readily manipulatable to assemble the data provided by the aircraft manufacturer, and fit the conditions of the particular combination of weight and balance so that the operator is enabled to safely load his plane.

A more particular object of the invention is to provide a compact simple unit in which various data is available so that the same by easy manipulation may be assembled, without complicated manipulation, and the results indicated with clarity and providing some range of safety within the various categories contemplated.

A more particular object of this invention is to provide a novel computer, which is embodied in a compact form including movable dials upon which the data is assembled, and which by movement, permits the data to be used for calculating the proper weight and balance distribution in an aircraft of the class to which the invention is directed.

Another object of this invention is to provide a visual indication of the assembly of such data whereby an indication of the safe operating conditions is provided.

Another object of this invention is to provide a simple computing device, which includes a series of dials upon which the data is provided, said dials being movable with respect to one another by suitable arms which will position certain of the dials whereby the same may be compared for indicating the existence of conditions which are suitable for operation or otherwise indicate that the aircraft is improperly loaded and must be changed.

Other and further objects of the invention will be understood from a consideration of the specification appended hereto, and shown in the drawings wherein;

FIGURE 6 is a graph representing certain data furnished by an aircraft manufacturer for example, and upon which the arrangement of the various indicia on the dials herein is based.

FIGURE 7 is a chart which provides the basis for establishing certain indicia on the various dials.

FIGURE 8 is a further chart showing additional information for provision of other indicia.

Figure 1:
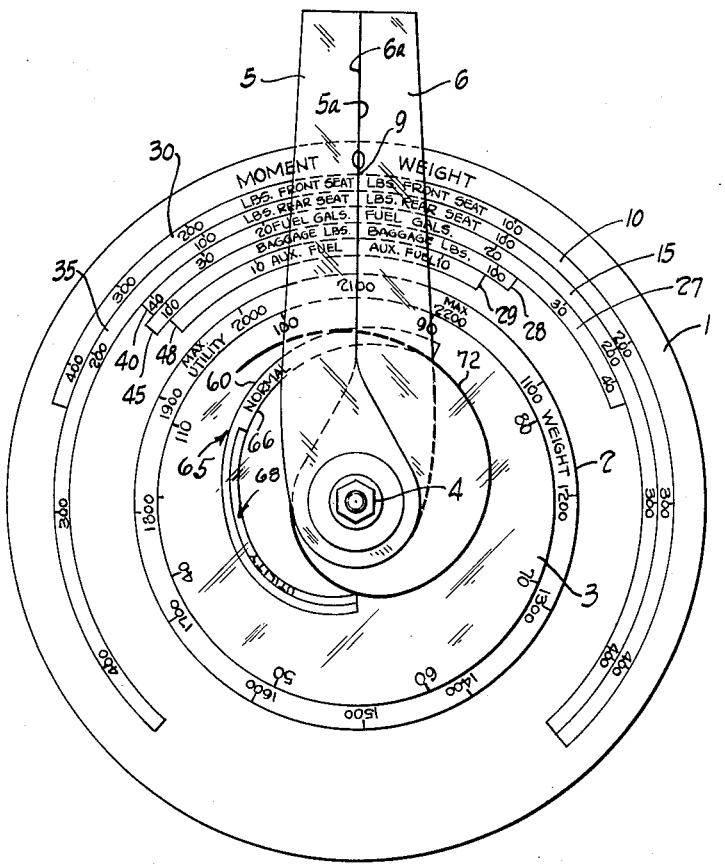
FIGURE 1 is a plan view of a computer constructed in accordance with this invention, and having data thereon particularly referring to a specific plane among the known types of personal planes.

Referring to the drawings, FIGURE 1 discloses the computer as being comprised of a series of dials including the main dial 1, the weight dial 2, and an index dial 3, the latter being preferably of transparent material for purposes which will be hereinafter set forth.

Figure 2:
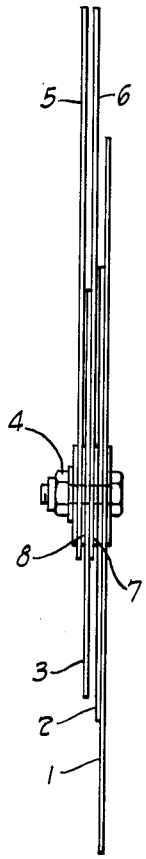
FIGURE 2 is an edge view of the computer shown in FIGURE 1.

Referring to FIGURE 2, it will be seen that the dial 1 is a base or main dial in effect, and the dials 2 and 3 are supported pivotally thereon, on the pivot 4, there being likewise pivotally mounted on the pivot 4 an index arm member 5 and a weight arm member 6 both of transparent material. The members 5 and 6 are frictionally engageable with the dials 3 and 2 respectively, so that under manipulation as will be subsequently explained, the dial 2 for example will move with the arm 6 unless restrained by holding with the finger for example there being a suitable friction washer such as 7 interposed between the dial 2 and the arm 6.

Correspondingly a suitable friction washer 8 is interposed between the arm 5 and the dial 3 so that unless the dial 3 is restrained, the arm 5 will be able to cause said dial to move therewith.

Figure 3:
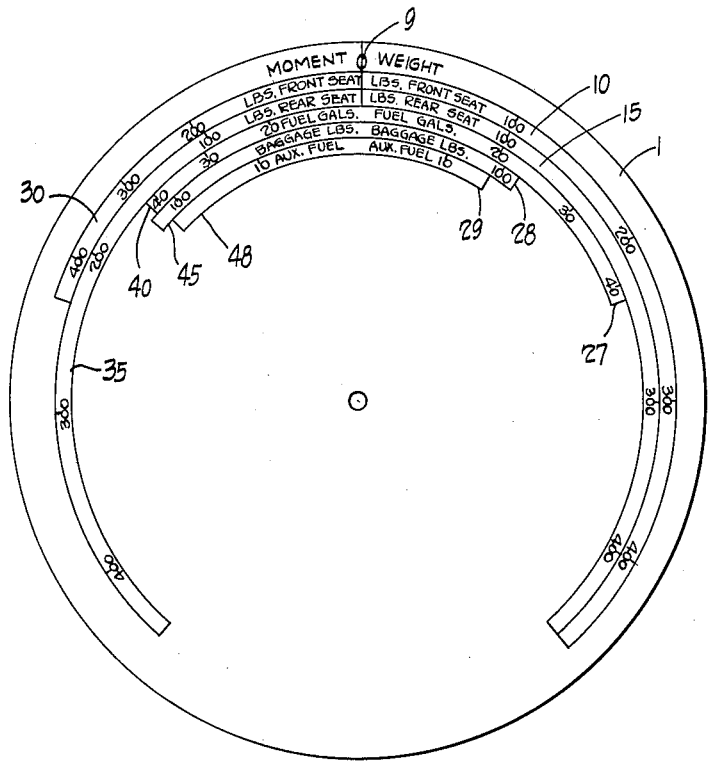
FIGURE 3 is a plan view of the main or base dial upon which moment and weight indicia are provided set forth in segmental relationship.
Figure 5:
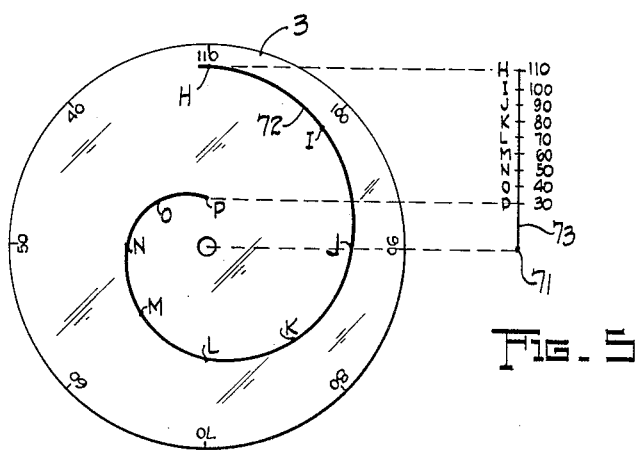
FIGURE 5 is a plan view of another dial, in this case the dial being preferably transparent, carrying moment indicia thereon and a scale providing an index.

Referring now to FIGURE 3, the main or base dial 1 is shown as having laid out thereon from a zero line 9, a series of segments upon which indicia are illustrated, which segments are formed and indicia laid out in accordance with the information provided in FIGURES 7 and 8.

It should be pointed out at this time, that the various figures to which reference will subsequently be made, have been selected with reference to a particular personal plane, in this case a plane known as the Cessna No. 172, and as such some of the data is supplied by the manufacturer and some of the data is availed of for illustrative purposes in accordance with the concept of the inventor.

In dealing with the base or main dial 1, there are two sections, one extending clockwise and having parts called weight sectors or segments, for this purpose the segment 10 referring to the front seat of the plane.

The circumferential relationship of the figures illustrated in the front seat segment 10, is based upon the division of the circumferential distance into equal arcs of one-twelfth (1/12) the circumference, each arc representing one hundred (100) pounds, as the entire circumference is divided into a total of twelve hundred (1200) pounds.

The segment 10 is laid out to represent four hundred fifty (450) pounds, and is thus three-eighths of twelve hundred (3/8 of 1200) pounds. It will correspondingly be indicated as one hundred thirty-five degrees (135°). Each one hundred (100) pounds, is one-twelfth of three hundred sixty degrees (1/12 of 360°) and thus the indicia noted represent one hundred (100) pounds, two hundred (200) pounds, three hundred (300) pounds and four hundred (400) pounds with the balance of the segment representing fifty (50) pounds as will be apparent.

The rear seat segment, is denoted 15, and is similarly divided up on the same basis as the segment 10 with indicia representing the successive increments of one hundred (100) pounds as will be readily understood from a consideration of the drawing.

The fuel segment is next referred to, and in this instance rather than being divided up into pounds is divided up into gallons, each gallon representing about six (6) pounds and so indicated with indicia placed at the 10, 20, 30 and 40 gallon marks.

The segment next referred to is the baggage segment and indicia denoting fifty (50) pounds and one hundred (100) pounds, are set forth thereon, it being borne in mind that the same scale is used throughout this description, twelve hundred (1200) pounds for the total circumferential distance.

The auxiliary fuel supply is the next segment and the indicia thereon is indicated only at the ten (10) gallon mark but sufficient space is provided for more indicia and more gasoline. The fuel, baggage and auxiliary fuel segments are themselves denoted 27, 28 and 29 respectively.

The weight section of the dial 1 having been described, the moment section will next be referred to, this area extending in a counter-clockwise direction from the zero line 9 and the segments in this instance being based upon the data supplied in FIGURE 8 with the same segment names as for the moment section. In this instance the circumferential distance of three hundred sixty (360) degrees is equal to eighty thousand (80,000) inch pounds as a basic scale by which the various indicia are located.

Referring to this moment section of the dial therefor, the front seat segment is denoted 30, having indicia at the one hundred (100) pound mark, two hundred (200), three hundred (300) and four hundred (400). As will be noted from FIGURE 8, the total arc over which this segment extends, is based upon an arm of thirty six (36) inches, which provides sixteen thousand four hundred (16,400) inch pounds moment and thus represents .205 of three hundred sixty degrees (360°) or seventy four degrees (74°) approximately.

The rear seat segment of the moment section of the dial, is determined at a basic arm of seventy (70) inches, providing thirty one thousand five hundred (31,500) inch pounds moment or one hundred forty-two degrees (142°) approximately as indicated in FIGURE 8. This segment denoted 35, is divided into the respective parts with indicia at the one hundred (100) pound mark, two (200) pounds, three hundred (300) pounds and four hundred (400) pounds.

Correspondingly the fuel segment is denoted 40 being divided into parts with indicia for 10, 20, 30 and 40 gallons.

The baggage segment denoted 45 is provided with indicia at fifty (50) pounds and one hundred (100) pounds.

The auxiliary fuel segment 48 is provided with the indicia at 10 gallons.

The various calculations upon which the foregoing indicia locations are based, have been derived from disclosures in FIGURES 7 and 8 as will be readily understood.

Figure 4:
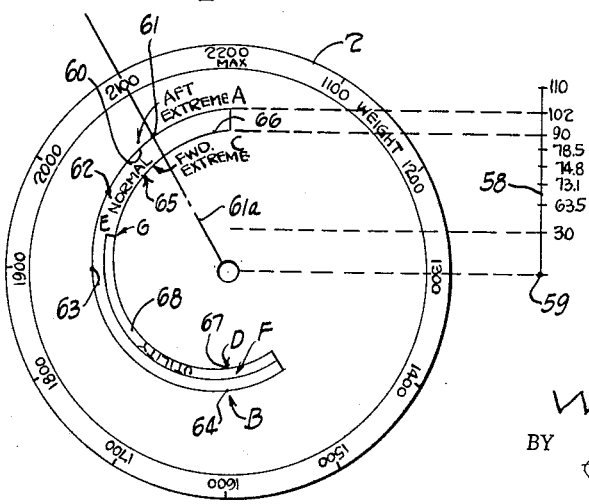
FIGURE 4 is a plan view of a dial designated as the weight dial and indicia carried thereon and a scale indicating the range of moments.

Next the weight or moment dial will be referred to, the same being illustrated separately from the computor in FIGURE 4. In this case the circumferential distance is similarly divided into twelve hundred (1200) pounds total distance and the indicia such as eleven hundred (1100) denoted thereon is thus one-twelfth (1/12)) of the total circumferential distance, indicia subsequent thereto being provided for each one hundred (100) pounds representing an arc of one-twelfth (1/12) the circumferential distance.

Since this particular dial is also termed a moment dial, there is translated thereon certain data which is supplied by the manufacturer, this data being laid out in the form of a band which is basically a generally spiral band.

For this purpose FIGURE 6 is referred to, the graph being furnished basically by the aircraft manufacturer and showing the center of gravity range data thereon. The graph is denoted 53 and shows the so-called aft extreme or limit established by the line 54, the line being essentially A—B, with the forward extreme covered by the line 55 extending from C to G and to D. The area enclosed thereby, A, B, D and C will be classed as the normal category being the area within which safe operation of the plane can be effected in accordance with the data translated to the computer herein as will be subsequently explained in detail.

The utility category as indicated by the area D, F, E, G and data acquired therefrom will be similarly translated to the dial 2, in a manner likewise to be described.

As is well known, the center of gravity range data is computed on various moment arms, and as illustrated in FIGURE 6, the graph includes the weight elements generally indicated at 56 and the moment arms generally indicated at 57, the former being in pounds and the latter in inches, all measured from the datum of the aircraft in accordance with known means for calculating the same.

Referring again to FIGURE 4, the data from the FIGURE 6 illustration, are translated to the dial 2 by finding the various moments and laying the same out on a line 58, which line is of arbitrary length and representing moments from thirty to one hundred ten thousand (110,000) inch pounds.

As an illustration of the location of a point 61 on line 60, the moment at the twenty one hundred (2100) pound indicia of the circumferential weight scale is determined, since a radial line 61a from the center of the dial extends through the point 61 and said indicia.

The distance along said radial line equals the distance from the point 59 of line 58 to the value along said line equal to the moment (thousands omitted) 97.44.

Using dividers said distance is thereafter laid out along the radial line 61a by use of dividers. Successive points at two thousand (2000) pounds, 62, nineteen hundred (1900) pounds at 63 and successively to the sixteen hundred (1600) pound point 64 similarly determined will furnish an outer line by connecting such points and represent the aft extreme for the band which will be generally designated 65.

The forward extreme line 66 is similarly laid out, translating the data from the graph of FIGURE 6, the line thereby extending from C to D, the area between lines 60 and 66 thus comprises a band denoted the normal category band. A similar band of much smaller extent denoted 68 is calculated and is denoted the utility category band having been laid out in an identical manner to that just heretofore described availing of data from the graph of FIGURE 6.

The band 65 thus provided, is a generally spiral representation of the graph of FIGURE 6 as will be readily understood.

There is next described, the index dial which is denoted 3 in the drawings, this dial being of transparent material and rotatable on the axis 4. The circumferential distance of the dial in this instance is divided into equal arcs of forty five degrees (45°) each, with the total circumferential distance the equivalent of eighty thousand (80,000) inch pounds, whereby the indicia 110 represents one hundred ten thousand (110,000) inch pounds, 100 represents one hundred thousand (100,000) inch pounds, with subsequent indicia 90, 80, etc., being similarly representative.

On the dial 3, an index line 72 is formed, which is provided by connecting points laid out on radial lines extending from the center and transferred from the line 73 in the same manner as the points on the line 58 of FIGURE 4. In this instance the distances are uniformly decreasing from H to P and at uniform spiral results. Thousands are again eliminaetd.

It will be noted that this spiral line 72 is laid out in a clockwise manner in contrast to the band 65 which is laid out in counter-clockwise manner for purposes which will be understood in subsequent explanation.

With the foregoing details of construction of the computer having been set forth, it is appropriate to select a specific set of values which can be availed of in aircraft loading, and in this instance a particular aircraft for which these figures are computed.

In order to provide a basis from which to start the analysis and thereby determine whether the aircraft is properly loaded, an index number which is denoted the empty aircraft index is ascertained, this being essentially computed by availing of a formula in which the arm provided by the manufacturer, in this instance thirty seven inches is used. In this example, the thousands are again omitted and by multiplying 37 times the empty weight of the plane, which in this particular example is thirteen hundred (1300) pounds, and dividing the product by one thousand (1000), an index number of 48, approximately results.

With the index number 48 thus calculated, and the operator of the plane having determined the various weights which he is going to carry, in the front seat and the rear seat, the fuel load, baggage weight and the auxiliary fuel load, he will transfer these figures to the computer by first of all setting the arm member 5 with its edge 5a at the point on the dial 3 which will correspond to the index 48. Thereafter he will move the arm member 5, together with the dial 3 up to the zero position. Thereafter by holding the dial 3 he will move the arm member 5 to the indicia on the moment side of the scale in the front seat segment at 200 pounds for example which would be the weight which he will locate in the front seat of the plane. The dial 3 will thereupon be moved clockwise by the arm 5 until the edge 5a is opposite the zero point once again and subsequent manipulation of the arm member 5 in like manner will accumulate the weights on the moment section of the dial 1 successively. In this instance the weights selected are two hundred (200) pounds in the front seat, two hundred (200) pounds in the rear seat, forty (40) gallons of fuel, one hundred (100) pounds of baggage, and ten (10) gallons of auxiliary fuel.

This will bring the dial 3 to a position wherein the edge 5a of the arm member 5 crosses the dial at a point between the indicia 100 and 90 approximately where the number 95 would be found, the spiral line 72 occupying the dotted line position as indicated in FIGURE 1.

By retaining the dial 3 in the position just stated, subsequent manipulation of the dial 2 will be resorted to by the arm member 6, with the edge 6a being the reference edge.

Initially the dial 2 is set with the thirteen hundred (1300) pound mark at the zero point, this being the empty weight of the plane.

Thereafter the arm member 6 is manipulated by retaining the dial 2 in position, with the arm member 6 having its edge 6a moved to the position on the segment 10, where the two hundred (200) pound indicia is located. The arm member 6 is thereupon operated in a counterclockwise direction to carry the dial 2 along with it until the edge 6a has reached the zero line 9.

Subsequent accumulation of the identical values previously used for the weight side or section of the dial 1, namely two hundred (200) pounds for the front seat, two hundred (200) pounds for the rear seat, forty (40) gallons of fuel, in the main tank, one hundred (100) pounds of baggage and ten (10) gallons of fuel in the auxiliary tank, will bring the dial 2 to a point where the total load of twenty one hundred (2100) pounds will be opposite the zero line 9 and the band 65 will be about as shown in dotted lines in FIGURE 1.

In the condition of the parts just mentioned, it will be noted that the spiral line 72 is now shown as a dotted line in FIGURE 1 in its position assumed in view of the translation of the various values thereto which were initially given, such line thereby crossing the band 65 within said band, and between the aft extreme line 60 and the forward extreme line 66. The aircraft will thereby be seen to be safely loaded permitting proper manipulation of the plane during flight and safe operation thereof. This is determined because the index line 72 crosses within the band 65 on the zero line 9 as indicated by the adjacent condition of the edges 5a and 6a of the arm members 5 and 6 respectively which coincide therewith.

The operator of the aircraft however must ascertain whether the total load, which is twenty one hundred (2100) pounds is within the operating category and in this instance it obviously is since it is less than the twenty two hundred (2200) pounds maximum load with which the plane is designed to operate under normal conditions of generally level flight without any acrobatic maneuvers being contemplated.

Where other values than those enumerated specifically for the front rear and other elements are exceeded, if the index line 72 is above the band 65, this indicates that the load is too far aft and must be definitely shifted to bring the same into safe position.

Conversely if the index line 72 is below the band 65, as viewed along the zero line extended, then the load is too far forward and should be shifted or otherwise varied so that the plane is thereby arranged for safe operation.

Since the band represented by the utility section and denoted 68, is of much narrower range, it will be seen that suitable values of only limited extent can be used so that the index line 72 will fall within this band only for minimum loads, in what is known as the utility category wherein certain maneuvers of the plane may be undertaken providing such loading is proper as indicated.

It will be understood that corresponding computers may be established for all types of private or personal planes with data supplied by the manufacturer being susceptible of translation in like manner to that heretofore described with reference to the particular plane used as an example herein.

It will also be clear that instead of having the data heretofore referred to translated into dials for circular manipulation the same may be similarly arranged in a linear manner for incorporation into a different type of computer mechanism.

In any event the concept herein is embodied in a computer which will readily provide indication to the operator of an aircraft of the type contemplated so that he is instantly aware of the conditions which will exist and can be advised of the safe operating range thereby or of the possible unsafe arrangement of the weight or overloading which might exist under any conditions and which may be responsible in conjunction with improperly located loads for many small plane or personal plane accidents.

The weight and influence of engine oil is not shown but is compensated for in the fuel weight and moment factors previously referred to.

I claim:

1. In a computer of the class described, in combination, a base member, a series of weight segments of arcuate form radially spaced from a fixed axis, spaced graduations on said segments related to a common quantity to indicate weight and extending from a common reference, a series of moment segments of arcuate form radially spaced from said fixed axis, spaced graduations on said segments related to a second common quantity and extending from said common reference, a weight dial rotatably mounted on said common axis and having spaced graduations arranged circumferentially thereon, center of gravity range indicating means on said second dial comprising an area formed by transferring a series of moments computed along the aft extreme from the datum line of an aircraft to radial positions opposite the weight indicia on the weight dial to form the outer line of said area, the inner line of said area being provided by transferring to similar radial positions, a series of moments computed along the forward extreme from the datum line aforesaid, means rotatable on said common axis to operate said weight dial and accumulate a series of weight thereon transferred from said weight segments, a moment dial rotatably mounted on said common axis and having spaced graduations circumferentially arranged thereon, means to move said moment dial to accumulate a series of moment from said moment segments, and an index element movable with said moment dial to intersect the range indicating means to indicate the relationship of the load and moment of an aircraft.

2. The combination as claimed in claim 1, wherein the index element comprises a line connecting radially positioned points aligned with circumferentially spaced indicia, the radial position of each point being proportional to the moment computed at said point.

3. In a computer of the class described, in combination, a base member, a series of weight segments of arcuate form radially spaced from a fixed axis, spaced graduations on said segments related to a common quantity to indicate weight and extending from a common reference, a series of moment segments of arcuate form radially spaced from said fixed axis, spaced graduations on said segments related to a second common quantity and extending from said common reference, a weight dial rotatably mounted on said common axis and having spaced graduations arranged circumferentially thereon, center of gravity range indicating means on said second dial comprising an area formed by transferring a series of moments computed along the aft extreme from the datum line of an aircraft to radial positions opposite the weight indicia on the weight dial to form the outer line of said area, the inner line of said area being provided by transferring the similar radial positions, a series of moments computed along the forward extreme from the datum line aforesaid, means rotatable on said common axis to operate said weight dial and accumulate a series of weight thereon transferred from said weight segments, a moment dial rotatably mounted on said common axis and having spaced graduations circumferentially arranged thereon, means to move said moment dial to accumulate a series of moment from said moment segments, and an index element movable with said moment dial to intersect the range indicating means to indicate the relationship of the load and moment of an aircraft, the center of gravity range indicating means comprising a band extending counter-clockwise on the face of the weight dial, the moment dial is transparent, and the index element is a line extending clockwise thereon, said line being thereby in a position to intersect said band when safe loading conditions of such aircraft are provided.

References Cited in the file of this patent

UNITED STATES PATENTS

| | | |
|---|---|---|
| 1,918,188 | Luckey | July 11, 1933 |
| 1,922,465 | Woodward | Aug. 15, 1933 |
| 2,283,789 | Favalora | May 19, 1942 |
| 2,954,162 | Parigini | Sept. 27, 1960 |
| 2,979,256 | Cushman | Apr. 11, 1961 |